Figure 3:
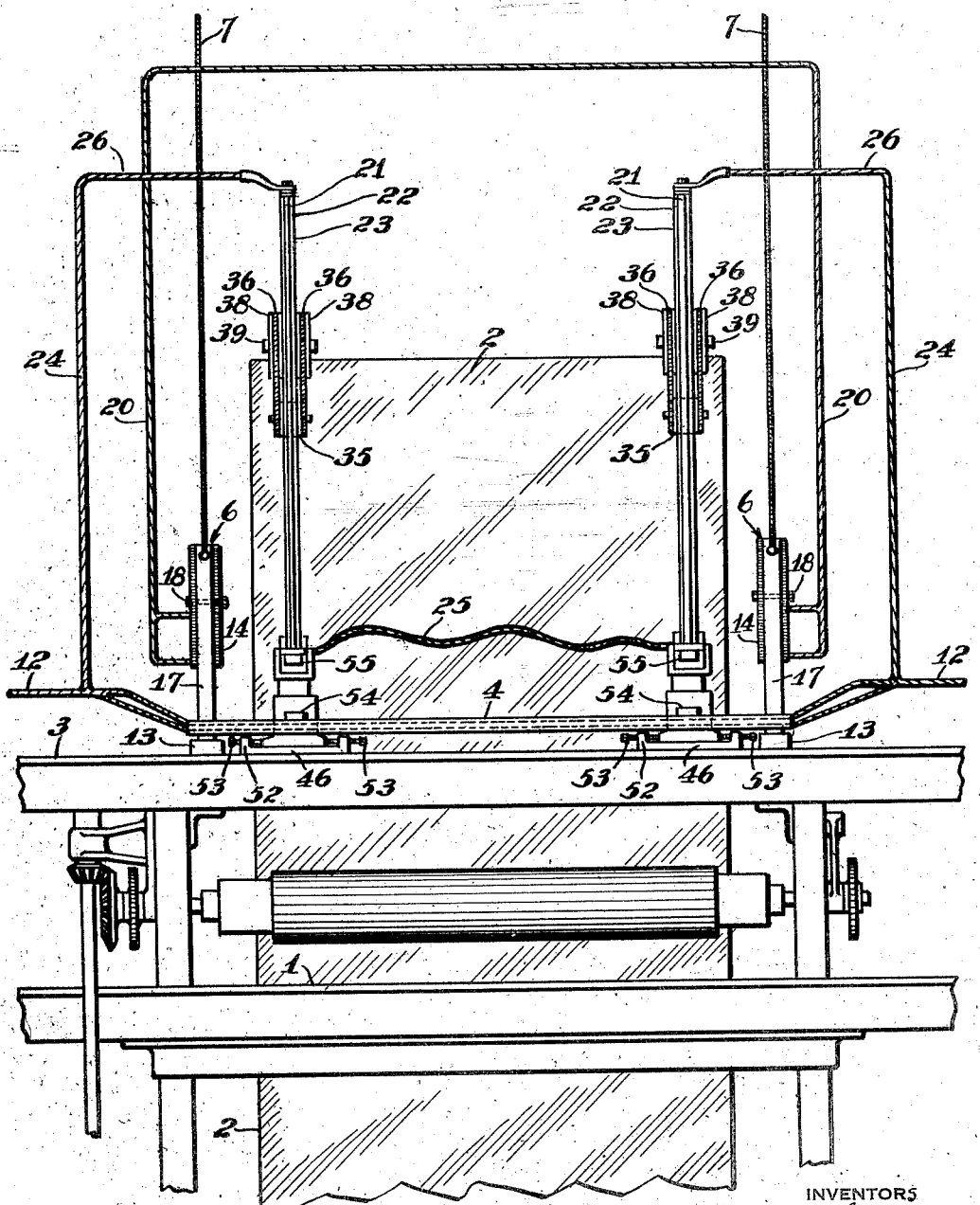

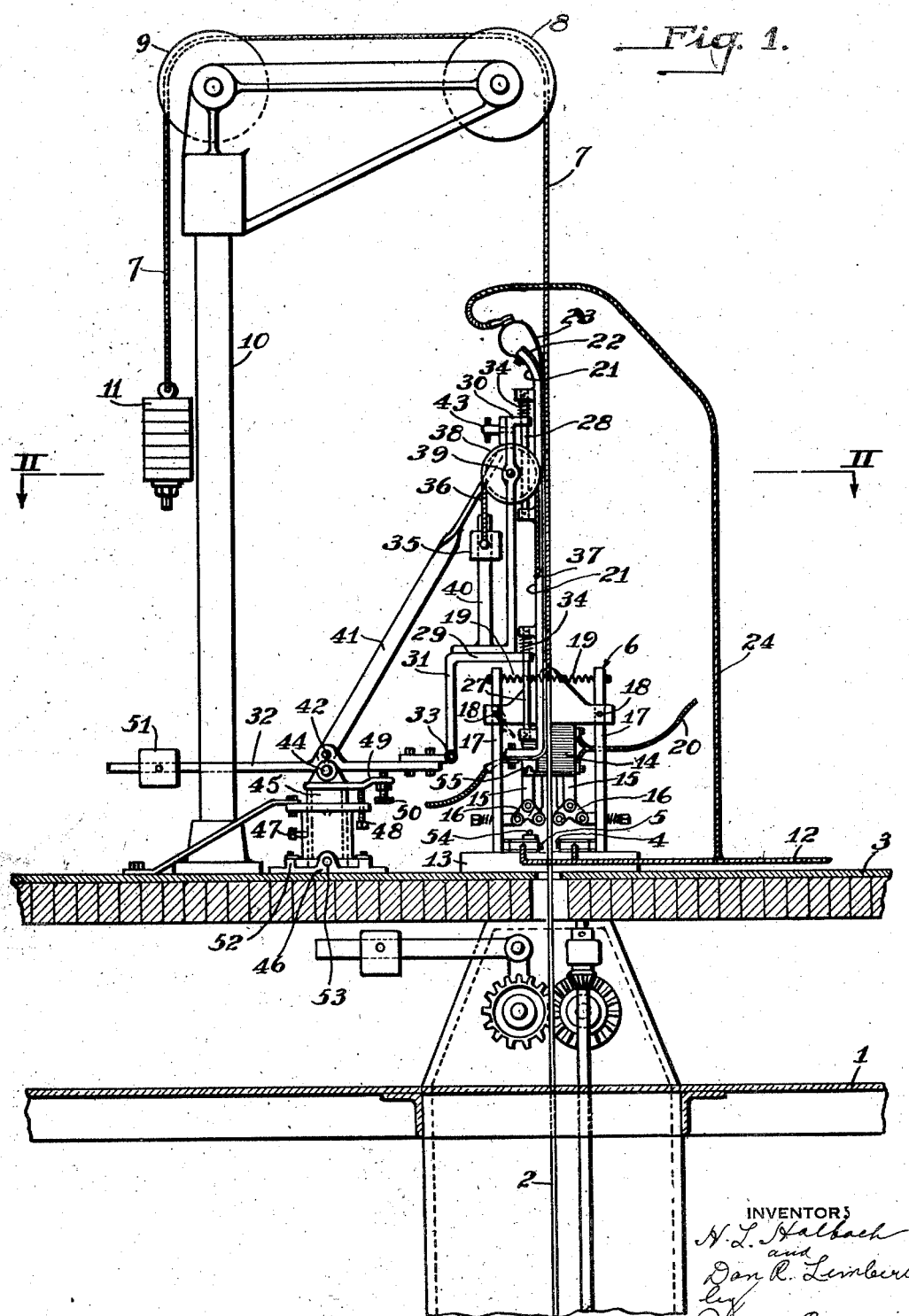

Jan. 21, 1930.  H. L. HALBACH ET AL  1,744,046
APPARATUS FOR SEVERING THE EDGES OF GLASS SHEETS
Filed Sept. 21, 1928  3 Sheets-Sheet 2
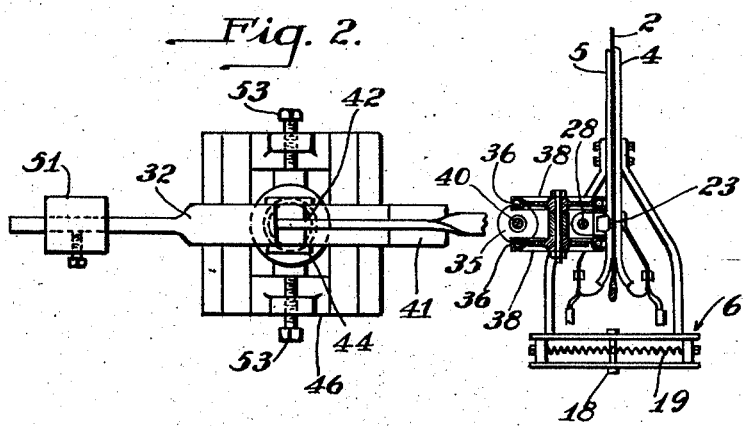
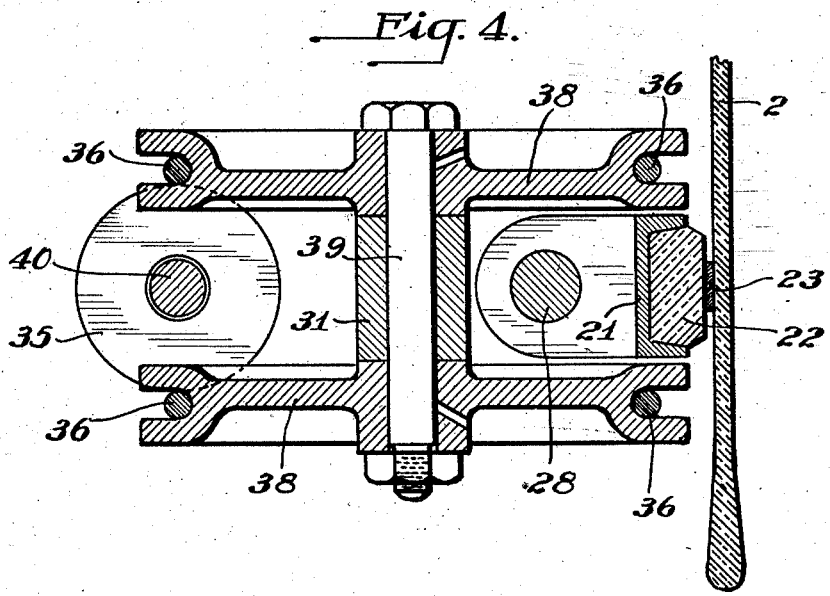
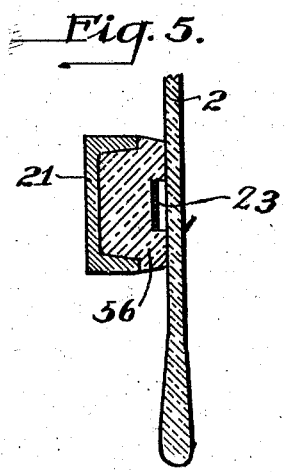
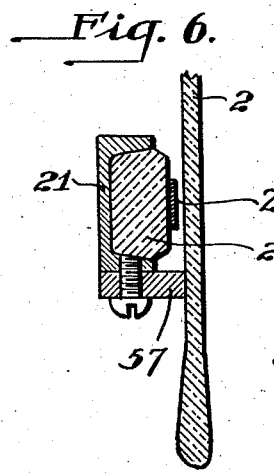
INVENTORS
Howard L. Halbach
and
Dan R. Lembers
by
James E. Bradley
Atty Patented Jan. 21, 1930

1,744,046

UNITED STATES PATENT OFFICE

HOWARD L. HALBACH AND DON R. LIMBERS, OF CLARKSBURG, WEST VIRGINIA, ASSIGNORS TO PITTSBURGH PLATE GLASS COMPANY, A CORPORATION OF PENNSYLVANIA

APPARATUS FOR SEVERING THE EDGES OF GLASS SHEETS

Application filed September 21, 1928. Serial No. 307,442.

The invention relates to an apparatus for severing the edges of a continuously formed glass sheet. The invention is designed particularly for use with the severing apparatus shown in the Slingluff Patent No. 1,373,533, but is not limited to use with such apparatus. It constitutes a modification of the apparatus shown in the application of H. L. Halbach, Serial Number 251,146. The present construction differs from that of the Halbach application in that the edge severing means are supported independently of the transverse severing means instead of being carried thereby. The invention has for its objects the provision of an edge severing device wherein the heat may be applied to the edge severing strips or elements in advance of the application of the heat to the transverse severing elements, and in which the edge severing strips may be adjusted independently to meet requirements. Certain embodiments of the invention are illustrated in the accompanying drawings, wherein:

Figure 1 is a side elevation. Fig. 2 is a horizontal section on the line II—II of Fig. 1. Fig. 3 is a front view. Fig. 4 is an enlarged section also taken on the line II—II of Fig. 1. And Figs. 5 and 6 are detail sections showing modifications.

Referring to the drawings, 1 is the floor above which the cutting off apparatus is located, the drawing machine which produces the continuously upwardly moving glass sheet 2 being located on the floor beneath. A platform 3 carries the severing apparatus. The device for cutting the sheet into sections (shown in the patent and application above referred to) constitutes no part of the present invention, but because of its relation to the edge trimming devices, is shown on the drawings and will be briefly described. It comprises a pair of transverse bars 4 and 5 on opposite sides of the glass sheet and each provided with a resistance ribbon. These bars are carried by frames 6, 6 supported by cables 7, 7 passing around the pulleys 8, 8 and 9, 9 carried upon the standards 10, 10, weights 11 being secured to the ends of the cables as counterweights. Current is supplied to the ribbons by means of the leads 12, 12 and the frames, when in lowered position, rest on stop blocks 13, 13 (Fig. 3). The bars 4 and 5 are moved toward each other to engage the glass sheet by means of the solenoids 14, 14 whose rods 15, 15 are connected through the toggles 16, 16 with the levers 17, 17. These levers are pivoted to the frames 6, 6 at 18, 18, and carry the bars 4 and 5 at their lower ends. The springs 19, 19 serve to move the bars 4 and 5 away from the glass after current to the solenoid windings is cut off. Such current is supplied through the leads 20, 20.

The edge trimming equipment consists of a device at each edge of the sheet which are duplicates, so that a description of one device will suffice for both. This device includes a vertical bar 21 having the form of a channel in cross section (Fig. 4). A strip of insulating material 22 is mounted in the channel and supports a resistance ribbon 23. The ribbons are connected to the leads 12, 12 by means of the connections 24, 25 and 26, as indicated in Fig. 3.

The bar 21 has secured to its rear side the guide bars 27 and 28 which extend slidably through the brackets 29 and 30 forming a part of the frame 31, such frame being pivoted to a supporting arm 32 at 33. Springs 34, 34 cushion the downward movement of the bar 21 with respect to the brackets 29 and 30. The bar 21 is counterbalanced by means of a weight 35 and a cable 36 secured to the bar at 37 and extending over the pulley 38 journaled at 39 on the frame 31. The weight is guided upon a rod 40 secured to the frame 31. The frame is supported in any desired position of adjustment about its pivot 33 by means of the brace 41 secured at its lower end to a lug on the arm 32 by means of a pivot pin 42. The upper end of the brace is slotted and clamped by a thumb screw 43 whose shank extends through the slot and is threaded into the upper end of the frame.

The arm 32 is pivoted at 44 upon a standard 45. This standard is vertically adjusted in a base 46, being held in adjusted position by a set screw 47 and a stop screw 48. An arm 49 secured to the standard carries a stop screw 50 which determines the angular position of the arm 32. The arm 32 is provided with a counterweight 51. The base 46 is flanged (Fig. 1) and mounted for lateral movement in the guide plate 52 bolted to the platform 3. This permits the base to be adjusted laterally so that the resistance ribbon may be positioned at the proper distance from the edge of the sheet, as the width of the sheet may vary somewhat from time to time. The base is locked in adjusted position by means of the screws 53, 53 (Fig. 3).

In operation, current is supplied through the leads 12, 12 before the solenoids 14, 14 are energized to clamp the bars 4, 5 to the glass. The ribbons 23, 23 thus heat lines along the edges of the glass before the ribbons carried by the bars 4, 5 engage the glass. After the solenoids are energized, thus clamping the bars 4, 5 to the glass, such bars move up with the glass until the blocks 54 carried by the bar 5 engage the blocks 55 carried by the channel 21, after which such channel moves upward with the bars during the remainder of the heating period, the guide bars 27 and 28 carried by the channel sliding through the brackets 29 and 30. Current to the leads 12, 12 and 20, 20 is then cut off. The bars 4 and 5 are now separated by the springs 19, 19 and a wetted tool is applied to the end of the heated line across the sheet, causing the glass to crack off along such line. The operator grasps the sheet just before such cracking off operation to support it, and when the sheet is separated, he carries it to a rack and deposits it there. He then applies a wetted tool to the ends of the heated lines which have been in contact with the ribbons 23, 23, causing the edges to crack off along the lines of heating. After the sheet has been cracked off and removed, the bars 4 and 5 and the channels 21, 21 move down by gravity to their starting positions, as shown in Fig. 1, the springs 34, 34 cushioning the downward movement of the channels.

The pivotal support of the frame 31 at 33 permits the channel to be adjusted to an angle such that the ribbon contacts with the glass throughout the operative portion of its length. This adjustment is desirable as the sheet ordinarily departs from a vertical plane somewhat, and the degree of departure varies from time to time. The supporting of the frame on the pivoted arm 32 is also desirable as this provides means for giving the ribbon on the bar 21 a yielding engagement with the glass which can be adjusted in degree by moving the counterweight 51 in and out. The stop screw 50 prevents the device from tilting too far forward after the glass sheet has been cut off and removed. The standard 45 may be adjusted vertically to regulate the height of the bar 21 above the platform, and the lateral adjustment of the base 46 in the plate 52 permits the device to be adjusted to suit sheets of varying widths.

Figs. 5 and 6 show modifications in which means are provided to keep the heating ribbons 23 out of contact with the glass so that the glass is heated by radiation rather than by direct contact. This protects the ribbons from wearing away incident to the sliding contact with the glass, but more heat is required. In the Fig. 5 construction, the ribbon is set into a groove in the insulating strip 56, while in the Fig. 6 construction, a bar 57 of asbestos board or the like is secured to the side of the bar 21 and engages the glass in the manner illustrated so that the ribbon is maintained out of contact with the glass.

What we claim is:

1. Apparatus for separating the edge of an upwardly moving sheet of glass, comprising a heating element extending longitudinally of the sheet adjacent the edge thereof, a fixed supporting member, a second supporting member pivoted on said fixed member and carrying said heating element so that the element is free to adjust itself to the position of the sheet, and means for causing a flow of electric current through said element to heat it.

2. Apparatus for separating the edge of an upwardly moving sheet of glass, comprising a fixed supporting member, an arm extending transversely of the plane of the sheet pivoted to said member, an upright heating element carried by said arm and adapted to engage the sheet adjacent its edge, and means for causing a flow of current through said element to heat it.

3. Apparatus for separating the edge of an upwardly moving sheet of glass, comprising a fixed supporting member, a counterbalanced arm extending transversely of the plane of the sheet pivoted to said member, an upright heating element carried by said arm and adapted to engage the sheet adjacent its edge, and means for causing a flow of current through said element to heat it.

4. Apparatus for separating the edge of an upwardly moving sheet of glass, comprising a fixed supporting member, an arm extending transversely of the plane of the sheet pivoted to said member, an upright guide carried by said arm, a heating element mounted for vertical movement along said guide and adapted to engage the sheet adjacent its edge, and means for causing a flow of current through said element to heat it.

5. Apparatus for separating the edge of an upwardly moving sheet of glass, comprising a fixed supporting member, an arm extending transversely of the plane of the sheet pivoted to said member, an upright guide carried by said arm, a heating element mounted for vertical movement along said guide and adapted to engage the sheet adjacent its edge, means for counterbalancing said element, and means for causing a flow of current through said element to heat it.

6. Apparatus for separating the edge of an upwardly moving sheet of glass, comprising a fixed supporting member, an arm extending transversely of the plane of the sheet pivoted to said member, an upright guide carried by said arm, a heating element mounted for vertical movement along said guide and adapted to engage the sheet adjacent its edge, means for counterbalancing said element, means movable with the sheet for engaging the element and moving it upward, and means for causing a flow of current through said element to heat it.

In testimony whereof, we have hereunto subscribed our names.

HOWARD L. HALBACH.
DON R. LIMBERS.